United States Patent Office 3,007,865
Patented Nov. 7, 1961

3,007,865
METHOD OF PREPARING A WELL COMPLETION AND SERVICING FLUID
Gerald G. Priest, Houston, Tex., assignor, by mesne assignments, to Jersey Production Research Company, Tulsa, Okla., a corporation of Delaware
No Drawing. Filed Nov. 18, 1957, Ser. No. 696,948
14 Claims. (Cl. 252—8.55)

The present invention is directed to a method for preparing an emulsified well completion and servicing fluid. More particularly, the invention is directed to a method for preparing an emulsified well completion and servicing fluid which is stable in wells above 190° F. In its more specific aspects, the invention is directed to preparation of a well completion and servicing fluid which is heat stable and which does not detrimentally affect subsurface earth formations on contact therewith.

The present invention may be briefly described as a method for preparing an emulsified well completion and servicing fluid which is stable at temperatures above 190° F. which comprises dissolving an emulsifying agent in water and then admixing the water containing said agent with an oily medium to form an emulsion. A water-soluble corrosion inhibitor and a water-soluble weighting agent are then added to the emulsion while agitating the emulsion, the weighting agent being employed in an amount sufficient to provide a controllable density to the emulsion, with the agitation being continued until the corrosion inhibitor and the weighting agent are dissolved in the aqueous phase of the emulsion, whereby a stable emulsion is obtained.

The particular features of the present invention involve adding a film strengthening agent where required and emulsifying agent to the water phase of the emulsion before emulsifying oils in the water phase and thereafter dissolving the inorganic weighting agent and the corrosion inhibitor in the emulsion while agitating the emulsion.

While it is desirable and preferable to use a water-soluble inorganic weighting agent in preparing the emulsion of the present invention, a water-soluble inorganic weighting agent may not be required under some conditions.

It is desirable to provide an emulsion which may be either heavier or lighter than the normal drilling fluid used in drilling wells, and the emulsion of the present invention may have a density in pounds per gallon in the range from about 7 to about 18 pounds per gallon. The emulsion where lighter than the drilling fluid may have a suitable viscosity sufficient to displace the drilling mud and to prevent displacement thereof by the drilling mud. For example, the viscosity of an emulsion prepared in accordance with the present invention may range from about 10 to about 4000 centipoises at 60° F.

The oily phase of the emulsion of the present invention may suitably be a liquid hydrocarbon, such as crude petroleum and fractions thereof, such as gasoline, kerosene, gas oil, diesel oil, and the like. Suitably, the hydrocarbon may have a viscosity at 60° F. of less than about 40 centipoises. While the oily phase may suitably be a hydrocarbon, other oily materials may be employed such as halogenated hydrocarbon derivatives, and the like.

There are many water-soluble, inorganic weighting agents which find use in the practice of the present invention among which may be mentioned, by way of illustration and not by way of limitation, alkali metal carbonates, alkali metal chlorides, zinc chloride, calcium chloride and sodium chloride which are particularly useful. Examples of the water-soluble inorganic weighting agents are presented in the following table:

TABLE I

*Water soluble inorganic compounds suitable as weighting agents*

| Name | Formula | Specific Gravity |
|---|---|---|
| Aluminum bromide | $AlBr_3$ | 3.01 |
| Aluminum chloride | $AlCl_3$ | 2.44 |
| Aluminum iodide | $AlI_3$ | 3.98 |
| Ammonium bromide | $NH_4Br$ | 2.33 |
| Ammonium iodide | $NH_4I$ | 2.51 |
| Ammonium nitrate | $NH_4NO_3$ | 1.72 |
| Ammonium phosphate, dibasic | $(NH_4)_2HPO_4$ | 1.62 |
| Antimony trichloride | $SbCl_3$ | 3.14 |
| Antimony trifluoride | $SbF_3$ | 4.38 |
| Barium acetate | $Ba(C_2H_3O_2)_2$ | 2.47 |
| Barium bromide | $BaBr_2$ | 4.78 |
| Barium iodide dihydrate | $BaI_2.2H_2O$ | 5.15 |
| Barium iodide hexahydrate | $BaI_2.6H_2O$ | 5.0 |
| Barium nitrite | $Ba(NO_2)_2$ | 3.23 |
| Cadmium acetate | $Cd(C_2H_3O_2)_2$ | 2.34 |
| Cadmium bromate monohydrate | $Cd(BrO_3)_2.H_2O$ | 3.8 |
| Cadmium bromide | $CdBr_2$ | 5.2 |
| Cadmium chlorate | $Cd(ClO_3)_2$ | 2.3 |
| Cadmium chloride | $CdCl_2$ | 4.05 |
| Cadmium iodide | $CdI_2$ | 5.67 |
| Cadmium nitrate tetrahydrate | $Cd(NO_3)_2.4H_2O$ | 2.45 |
| Cadmium sulfate heptahydrate | $CdSO_4.7H_2O$ | 2.48 |
| Calcium bromate monohydrate | $Ca(BrO_3)_2.2H_2O$ | 3.33 |
| Calcium bromide | $CaBr_2$ | 3.35 |
| Calcium chloride | $CaCl_2$ | 2.15 |
| Calcium iodide | $CaI_2$ | 3.96 |
| Calcium nitrate | $Ca(NO_3)_2$ | 2.36 |
| Cupric bromate hexahydrate | $Cu(BrO_3)_2.6H_2O$ | 2.58 |
| Cupric bromide | $CuBr_2$ | 2.8 |
| Cupric chloride | $CuCl_2$ | 3.05 |
| Cupric nitrate hexahydrate | $Cu(NO_3)_2.6H_2O$ | 2.07 |
| Ferric chloride | $FeCl_3$ | 2.81 |
| Ferric nitrate hexahydrate | $Fe(NO_3)_3.6H_2O$ | 1.68 |
| Ferric sulfate nonahydrate | $Fe_2(SO_4)_3.9H_2O$ | 2.1 |
| Ferrous bromide | $FeBr_2$ | 4.64 |
| Ferrous chloride | $FeCl_2$ | 2.70 |
| Lead acetate trihydrate | $Pb(C_2H_3O_2)_2.3H_2O$ | 2.55 |
| Lead chlorate monohydrate | $Pb(ClO_3)_2.H_2O$ | 4.04 |
| Lead nitrate | $Pb(NO_3)_2$ | 4.53 |
| Lithium bromide | $LiBr$ | 3.46 |
| Lithium iodide | $LiI$ | 4.06 |
| Magnesium bromide | $MgBr_2$ | 3.72 |
| Magnesium iodide | $MgI_2$ | 4.25 |
| Manganese bromide | $MnBr_2$ | 4.39 |
| Manganese chloride tetrahydrate | $MnCl_2.4H_2O$ | 2.01 |
| Manganese iodide | $MnI_2$ | 5.01 |
| Nickel bromide | $NiBr_2$ | 4.64 |
| Nickel nitrate hexahydrate | $Ni(NO_3)_2.6H_2O$ | 2.05 |
| Potassium acetate | $KC_2H_3O_2$ | 1.8 |
| Potassium carbonate | $K_2CO_3$ | 2.29 |
| Potassium fluoride | $KF$ | 2.48 |
| Potassium iodide | $KI$ | 3.13 |
| Potassium nitrite | $KNO_2$ | 1.92 |
| Potassium phosphate | $K_3PO_4$ | 2.56 |
| Sodium bisulfate | $NaHSO_4$ | 2.74 |
| Sodium bromide | $NaBr$ | 3.20 |
| Sodium chlorate | $NaClO_3$ | 2.49 |
| Sodium chloride | $NaCl$ | 2.16 |
| Sodium hydroxide | $NaOH$ | 2.13 |
| Sodium iodide | $NaI$ | 3.67 |
| Sodium nitrate | $NaNO_3$ | 2.26 |
| Sodium nitrite | $NaNO_2$ | 2.17 |
| Sodium phosphate monobasic | $NaH_2PO_4.2H_2O$ | 1.91 |
| Zinc bromide | $ZnBr_2$ | 2.56 |
| Zinc chloride | $ZnCl_2$ | 2.91 |
| Zinc iodide | $ZnI_2$ | 4.66 |
| Zinc nitrate hexahydrate | $Zn(NO_3)_2.6H_2O$ | 2.06 |
| Zinc sulfate | $ZnSO_4$ | 3.74 |

The emulsifying agent employed in the practice of the present invention is suitably a water soluble alkali metal salt, an alkaline earth metal salt, or an ammonium salt of lignin sulfonic acids. Purified lignin sulfonic acids may be used in forming the alkali metal salts of lignin sulfonic acids. Such salts are known to the trade as the Polyfons and may have from about 3 percent to about 33 percent of alkali metal sulfonate groups. Other emulsifying agents may include the ammonium salts of lignin sulfonic acids such as those known to the trade as Orzans.

The Orzans are a new series of surface active chemicals derived from the by-products of wood pulping by the sulfite process using an ammonia base. In this process, wood chips consisting of about 90 percent western hemlock and 10 percent white fir are placed into a digester containing ammonium bisulfite and excess sulfur dioxide. The mixture is then cooked for about 8 hours at a temperature of about 290–300° F., while a pressure of 70–80 p.s.i. is maintained within the digester. After the cooking period, the mixture is filtered to separate the wood pulp from the bisulfite liquor.

Orzan A is obtained by concentrating the liquor by evaporation to about 50 percent solids, and then spray-drying the concentrated liquor. Orzan A, therefore, is an unaltered by-product of the pulping process containing ammonium lignin sulfonate and wood sugars.

Orzan S is a sodium salt of lignin sulfonate and is obtained by adjusting the concentrated ammonium bisulfite liquor to pH 7.0–7.5 with sodium hydroxide. At a pH of 7.0–7.5 the excess ammonia is driven off and the concentrated liquor is spray dried to obtain a free flowing powder.

The Orzans AH0, AH1, AH2, and AH3 are made by partially polymerizing the lignin sulfonate units present in Orzan A, increasing their average molecular weight. The member having the highest molecular weight is Orzan AH3.

The Polyfons are a new series of surface active chemicals based on lignin obtained as a by-product of pulping wood chips using the kraft process. In the kraft or sulfate process, the lignin is rendered soluble by digesting wood chips at about 160–180° C. with a mixture of one part of sodium sulfide and two parts of sodium hydroxide as a 5 percent solution. From the kraft black liquor the lignin, together with some hemicellulose, is precipitated by acidification with mineral acid. The lignin obtained in this manner is purified and then sulfonated to provide the various lignosulfonates such as Polyfon H, XQ, O, T, R, and F.

A more complete description of processes used in the isolation of lignin and the various lignin sulfonates, i.e., the kraft, soda, and sulfite processes, is given in a book entitled Cellulose and Cellulose Derivatives by E. Ott, H. Spurlin, and M. Grafflin, Interscience Publishers, Inc., New York, Ed. 2, part 2, pages 524–545.

The emulsifying agents employed in the present invention may suitably be used in an amount in the range from about 0.5 to about 20 grams per 100 ml. of the aqueous phase of the emulsion.

The percent by weight of the inorganic weighting agent or salt dissolved in the aqueous or water phase may suitably range from about 1 percent up to about saturation.

The emulsions of the present invention may suitably consist essentially of from about 5 percent to about 95 percent by volume of water with a preferred range from about 20 percent to about 80 percent by volume of water, while the oily phase may contain from about 5 percent to about 95 percent by volume of the emulsion, with a preferred range from about 20 percent to about 80 percent by volume of emulsion being the oily phase. In the present invention, the oily phase may contain an amount of tetrachloroethylene no less than about 1 volume percent of the oily phase. Suitably, the oily phase may consist essentially of tetrachloroethylene and may be 100 percent tetrachloroethylene. However, it may be desirable and preferable to employ from about 10 percent to about 50 percent by volume of the oily phase as consisting of tetrachloroethylene.

The corrosion inhibitor may be employed in a small but sufficient amount to inhibit the corrosivity of ferrous metal tubing and surfaces, such as well casing. An amount of corrosion inhibitor dissolved in the aqueous phase of the emulsion may range from about 0.001 to about 5 percent by weight of the aqueous phase.

Sodium chromate is a preferred corrosion inhibitor employed in preparing the emulsion, but other corrosion inhibitors may be useful. Water-soluble corrosion inhibitors, such as tributyl phosphate, calcium hydroxide, Polyrad 1110-A and F–126 are also useful corrosion inhibitors. Polyrad 1110-A is a product of reaction between ethylene oxide and a high molecular weight primary amine, whereas F–126 is principally the ammonium salt of perfluorocaprylic acid. Other water-soluble corrosion inhibitors, such as those known to the trade as Corexit 40, Corexit 730, or Corexit 70, all of which are fatty acid amides of high molecular weight amines, and also propargyl alcohol may be used in the improved method of preparing the emulsion.

It is desirable and sometimes preferable to employ a film strengthening agent as well as the emulsifying agent. The film strengthening agent gives strength to the film between the oil phase and the water phase of the emulsion. While the water-soluble salts of lignin sulfonic acids, such as sodium lignosulfonates and the Orzans and Polyfons mentioned supra, serve both as film strengthening agents and emulsifying agents, it may be desirable to use other compounds which serve both as film strengthening agents and emulsifying agents in the improved method of preparing the well completion and servicing fluids. For example, film strengthening agents such as butylene-maleic acid copolymer, polyacrylates, sulfonated polystyrene, and sulfonated phenol-formaldehyde condensation product or polymer may be used.

The amount of the film strenthening agent employed may vary from about 0.1 to about 10 grams per 100 ml. of the aqueous phase of the emulsified fluid. About 0.5 gram per 100 ml. gives very desirable results. It may be desirable and sometimes preferable to use a sodium lignosulfonate as a film strengthening agent and to use a Polyfon or an Orzan as the emulsifying agents. Combinations of these compounds as film strengthening and emulsifying agents in the practice of the present invention are particularly desirable.

In some instances it may be desirable to use as a film strengthening agent the alkali metal salts, such as sodium lignosulfonate, as a film strengthening agent and use one of the so-called Polyfons or Orzans as the emulsifying agent. In fact, the conjunct use of an alkali metal salt of lignin sulfonic acid and either a Polyfon or Orzan gives very desirable results in the improved method of preparing the emulsion.

Emulsions of the nature described herein are very useful in well completion and servicing fluids in wells where temperatures above 90° F. are encountered. These well completion and servicing fluids prepared in accordance with the present invention are heat stable and non-corrosive at the elevated temperatures which may be of the order from 190° up to 250° F. and may even be as high as 300° F. in high temperature wells ranging in depth from about 10,000 to about 25,000 feet. Usual operations may be conducted at depths from about 14,000 to about 18,000 feet. However, it is to be pointed out that the emulsions prepared in accordance with the improved method of the present invention may be useful in high temperature wells which may be encountered at lesser depths, for example, from about 6,000 to about 14,000 feet, depending on the area where the well completion operations are being conducted.

The emulsions prepared in accordance with the present invention may be used and are useful in numerous operations in oil and gas wells and the like. For example, these emulsions may be used as perforating fluids where casing and/or formations are perforated with a gun or shaped charge perforator and it is undesirable to allow the formations or strata so penetrated to be contacted with mud or other usual well completion fluids. Likewise, the present invention may be employed in blanketing a particular formation normally exposed to well fluids while operations are continued elsewhere in the hole. The present invention is also useful in doing remedial jobs in a well, such as replacing tubing, and the like, by first blanketing the exposed formation with the emulsion prepared in accordance with the present invention and then superimposing a column of drilling mud or other well controlling fluid above the blanket of the emulsion.

It is to be emphasized that certain steps are necessary and important in the particular sequence in the method of preparing the emulsified completion and servicing fluid which has a low fluid loss, is of controllable density, and may be used without deleteriously affecting exposed formations or earth strata. In the improved method, it is necessary that the film strengthening agent and emulsifying agent be dissolved in the water phase before emulsification. After the film strengthening agent and emulsifying agent are dissolved in the water phase, the water phase and oil phase are then mixed to form an emulsion and thereafter the emulsion has an inorganic weighting agent of the type mentioned before and a corrosion inhibitor added thereto, the inorganic weighting agent and corrosion inhibitor preferably being added as solids, although aqueous solutions of these materials may be used.

For example, the emulsion is best prepared by slowly adding the oil phase to the water phase while agitating the water phase. In the improved method of preparing the emulsion, a high speed blending assembly will provide the agitation necessary for good emulsification. For example, a centrifugal pump equipped with a choke in the outflow line of the pump may provide sufficient agitation in preparing the emulsion. Other types of pumping or mixing assemblies may be used which provide sufficient mechanical energy to disperse the oil into the water. The emulsion is prepared by mixing a water immiscible liquid with an aqueous solution containing a film strengthening agent and an emulsifying agent. After emulsification is complete, a small amount of corrosion inhibitor is dissolved in the external water phase, and finally, a sufficient amount of the inorganic weighting agent is added to the emulsion to saturate the external water phase. In adding the corrosion inhibitor and the weighting agent in the external water phase, moderate agitation of the emulsion may be employed.

In order to illustrate the invention further, comparisons were made of emulsions prepared in accordance with the present invention and emulsions prepared using a different sequence. The results of these comparisons are presented in Table II.

material composition as Emulsions 1, 2 and 3 but mixed in a different order as follows: 1. Saltkem, 2. Polyfon H, 3. Weighting agent, and 4. Oil phase. These emulsions are in the same weight range but are unstable at 250° F. in that two phases separate prior to 24 hours. The fluid loss is in the range from 17 to 38 cc. API and there is a substantial amount of oil in the filtrate, an indication of emulsion instability.

The nature and objects of the present invention having been completely described and illustrated, what I wish to claim as new and useful and secure by Letters Patent is:

1. A method for preparing an emulsified well completion and servicing fluid which is stable in wells at temperatures above 190° F. which consists of dissolving an emulsifying agent selected from the group consisting of the water-soluble alkali metal, alkaline earth metal, and ammonium salts of purified lignin sulfonic acids in water, mixing the water containing said agent with an oily medium to form an emulsion, and then adding to the emulsion a water-soluble corrosion inhibitor and a water-soluble weighting agent while agitating the emulsion, the weighting agent being employed in an amount sufficient to provide a controllable density to the emulsion, whereby the corrosion inhibitor and weighting agent are dissolved in the aqueous phase of the emulsion and a stable emulsion is obtained.

2. A method in accordance with claim 1 in which the corrosion inhibitor and weighting agent are added as solids.

3. A method in accordance with claim 1 in which the water-soluble salt is an ammonium salt.

4. A method in accordance with claim 1 in which the water-soluble salt is an alkaline earth metal salt.

5. A method in accordance with claim 1 in which the water-soluble salt is an alkali metal salt.

6. A method in accordance with claim 5 in which the water soluble salt contains from about 3% to about 33% of alkali metal sulfonate groups.

7. A method for preparing an emulsified well completion and servicing fluid which is stable in wells at tem-

TABLE II

*Properties of emulsions prepared by different methods*

| Fluid No. | Aqueous Phase, Vol. percent | Composition of Aqueous Phase | | | | Oil Phase | | Emulsifier | | Properties of Emulsions | | |
|---|---|---|---|---|---|---|---|---|---|---|---|---|
| | | Film Strengthening Agent | | Weighting Agent | | Identity | Vol. percent | Identity | g./100 ml. Aqueous Phase | Density, lb./gal. | Fluid Loss at 78° F., cc./30 min. | Remarks |
| | | Identity | g./100 ml. | Identity | Wt. percent | | | | | | | |
| 1 | 60 | Saltkem ¹ | 0.5 | ⁴ CaCl₂ | 40 | ³ Diesel Oil | 40 | ² Polyfon H | 0.5 | 9.6 | 12.2 | Stable at 250° F. |
| 2 | 50 | ---do.¹ | 0.5 | ⁴ CaCl₂ | 40 | {³ Diesel Oil, C₂Cl₄} | {12.5, 37.5} | ----do | 0.5 | 11.5 | 14.0 | Do. |
| 3 | 50 | ---do.¹ | 0.5 | ⁴ CaCl₂ | 40 | ³ C₂Cl₄ | 50 | ----do | 0.5 | 12.5 | 9.2 | Do. |
| 4 | 60 | ---do.¹ | 0.5 | ³ CaCl₂ | 40 | ⁴ Diesel Oil | 40 | ----do | 0.5 | 9.6 | {17 total, 4 (Oil)} | Unstable at 250° F. |
| 5 | 50 | ---do.¹ | 0.5 | ³ CaCl₂ | 40 | {⁴ Diesel Oil, C₂Cl₄} | {12.5, 37.5} | ----do | 0.5 | 11.5 | {22 total, 7 (Oil)} | Do. |
| 6 | 50 | ---do.¹ | 0.5 | ³ CaCl₂ | 40 | ⁴ C₂Cl₄ | 50 | ----do | 0.5 | 12.5 | {38 total, 11 (Oil)} | Do. |

(a) Saltkem is a proprietary name for sodium lignosulfonate.
(b) The superscripts show the order of addition of the components of the emulsion to the two phases.

Emulsions 1, 2, and 3 illustrate the high temperature emulsions prepared in the proper procedure of adding to the fresh water the desired chemicals in the following order: 1. Saltkem, 2. Polyfon H, 3. Oil phase, and 4. Weighting agent. These emulsions cover a density range of 9.6 to 12.5 lbs. per gal.; have fluid loss with none of the oil phase in the filtrate of 9.2 to 14.0 cc. API and are stable at 250° F. for 24 hours.

Emulsions 4, 5, and 6 illustrate emulsions of the same peratures above 190° F. which consists of dissolving a film strengthening agent selected from the group consisting of butylene-maleic acid copolymer, polyacrylates, and sulfonated phenol-formaldehyde condensation product and an emulsifying agent selected from the group consisting of the water-soluble alkali metal, alkaline earth metal, and ammonium salts of purified lignin sulfonic acids in water, mixing the water containing said agents with an oily medium to form an emulsion, and then adding to the emulsion a water-soluble corrosion inhibitor and a water-soluble weighting agent while agitating the emulsion, the weighting agent being employed in an amount sufficient to provide a controllable density to the emulsion, whereby the corrosion inhibitor and weighting agent are dissolved in the aqueous phase of the emulsion and a stable emulsion is obtained.

8. A method for preparing an emulsified well completion and servicing fluid which is stable in wells at temperatures above 190° F. which consists of dissolving an emulsifying agent selected from the group consisting of the water-soluble alkali metal, alkaline earth metal, and ammonium salts of purified lignin sulfonic acids in water in an amount in the range from about 0.5 to about 20 grams of the emulsifying agent per 100 ml. of the water, mixing the water containing said agent with an oily medium to form an emulsion, and then adding to the emulsion a water-soluble corrosion inhibitor in an amount in the range from about 0.001 to about 5 percent by weight of the water and a water-soluble weighting agent while agitating the emulsion, the weighting agent being employed in an amount sufficient to provide a controllable density to the emulsion in the range from about 7 to about 18 pounds per gallon, whereby the corrosion inhibitor and weighting agent are dissolved in the aqueous phase of the emulsion and a stable emulsion is obtained, the water and oily medium being employed in sufficient amounts to provide an emulsion containing from about 5 percent to about 95 percent by volume of oily medium, the oily medium containing from about 10 percent to about 100 percent by volume of tetrachloroethylene.

9. A method in accordance with claim 8 in which a film strengthening agent selected from the group consisting of butylene-maleic acid copolymer, polyacrylates, and sulfonated phenol-formaldehyde condensation product is added to the water prior to mixing with the oily medium in an amount within the range from about 0.1 to about 10 grams per 100 ml. of the water.

10. A method in accordance with claim 8 in which the corrosion inhibitor is sodium chromate.

11. A method in accordance with claim 8 in which the weighting agent is calcium chloride.

12. A method for preparing an emulsified well completion and servicing fluid which is stable in wells above 190° F. which consists of dissolving a water-soluble salt selected from the group consisting of alkali metal, alkaline earth metal and ammonium salts of purified lignin sulfonic acid in water to form a solution, mixing the solution with a liquid hydrocarbon to form an emulsion, and then adding to the emulsion a water-soluble corrosion inhibitor and a water-soluble weighting agent while agitating the emulsion, the weighting agent being employed in an amount sufficient to provide a controllable density to the emulsion, whereby the corrosion inhibitor and weighting agent are dissolved in the aqueous phase of the emulsion and a stable emulsion is obtained.

13. A method in accordance with claim 12 in which the liquid hydrocarbon is Diesel oil.

14. A method for preparing an emulsified well completion and servicing fluid which is stable in wells above 190° F. which consists of dissolving a film strengthening agent selected from the group consisting of butylene-maleic acid copolymer, polyacrylates, and sulfonated phenol-formaldehyde condensation product and water-soluble salt selected from the group consisting of alkali metal, alkaline earth metal and ammonium salts of purified lignin sulfonic acid in water to form a solution, mixing the solution with an oily medium containing tetrachloroethylene to form an emulsion, and then adding to the emulsion a water-soluble corrosion inhibitor and a water-soluble weighting agent while agitating the emulsion, the weighting agent being employed in an amount sufficient to provide a controllable density to the emulsion, whereby the corrosion inhibitor and weighting agent are dissolved in the aqueous phase of the emulsion and a stable emulsion is obtained.

References Cited in the file of this patent

UNITED STATES PATENTS

| | | |
|---|---|---|
| 1,829,705 | Walker | Oct. 27, 1931 |
| 2,564,753 | Cox | Aug. 21, 1951 |
| 2,661,334 | Lummus | Dec. 1, 1953 |
| 2,764,242 | Rohrback et al. | Sept. 25, 1956 |
| 2,805,722 | Morgan et al. | Sept. 10, 1957 |
| 2,894,584 | Birdwell et al. | July 14, 1959 |
| 2,898,294 | Priest et al. | Aug. 4, 1959 |